United States Patent [19]

Uto

[11] Patent Number: 5,373,352
[45] Date of Patent: Dec. 13, 1994

[54] ORIGINAL SCANNING DEVICE

[75] Inventor: Nobutaka Uto, Yokohama, Japan

[73] Assignee: Canon Kabushiki Kaisha, Tokyo, Japan

[21] Appl. No.: 235,153

[22] Filed: Apr. 28, 1994

Related U.S. Application Data

[63] Continuation of Ser. No. 970,842, Nov. 3, 1992, abandoned.

[30] Foreign Application Priority Data

Nov. 8, 1991 [JP] Japan .................................. 3-293031

[51] Int. Cl.$^5$ .............................................. G03G 15/28
[52] U.S. Cl. .................................... 355/233; 355/228; 359/227
[58] Field of Search ............... 355/228, 230, 233, 234, 355/235; 359/227, 234, 236; 250/235, 236

[56] References Cited

U.S. PATENT DOCUMENTS

| 4,057,341 | 11/1977 | Sohm | 355/234 |
| 4,318,609 | 3/1982 | Knechtel et al. | 355/233 |
| 4,560,238 | 12/1985 | Mori | 359/227 |
| 4,860,060 | 8/1989 | Wise et al. | 355/41 |
| 4,943,815 | 7/1990 | Aldrich et al. | 359/227 X |
| 5,016,978 | 5/1991 | Fargette et al. | 359/234 |
| 5,061,962 | 10/1991 | Takahashi | 355/233 |

OTHER PUBLICATIONS

IBM Technical Disclosure Bulletin, vol. 22 No. 3 (Aug. 1979), *Optic Sail,* Hanson et al.

*Primary Examiner*—A. T. Grimley
*Assistant Examiner*—Sandra L. Brasé
*Attorney, Agent, or Firm*—Fitzpatrick, Cella, Harper & Scinto

[57] ABSTRACT

An original scanning device includes an original mount for mounting an original, a movable scanning device for scanning the original mounted on the original mount while the movable scanning device is moving, an original scanning unit for further scanning the original when the original is at a position different from the position of the original mount, and an obturating member movable to obturate an optical path from the original mount to the main body of the device. The obturating member is moved to open and close the optical path in accordance with movement of the scanning device.

22 Claims, 11 Drawing Sheets

ORIGINAL SCANNING DEVICE

This application is a continuation of application Ser. No. 07/970,842 filed Nov. 3, 1992, now abandoned.

BACKGROUND OF THE INVENTION

1. Field of the Invention

This invention relates to an original scanning device for scanning an original, used in a copier, an image reader or the like, and more particularly, to a device which includes both a unit for scanning a fixed original and a unit for scanning a moving original.

2. Description of the Related Art

In a conventional original scanning device used in a copier or the like, an original is mounted on an original-mount glass, and the original is scanned by moving scanning means, comprising a lamp, a mirror and the like, provided below the original-mount glass relative to the original. In order to read an original without being restricted by the size of an original which, for example, is longer than the length of original-mount glass, devices have been developed in which an original scanning unit of a scrolling-reading-type for reading an original being conveyed is provided in addition to a scanning unit for reading an original mounted on the above-described original-mount glass.

In such a device, a light-transmitting window is in general provided along side of the original-mount glass so that light from the original scanned by the scrolling-reading original scanning unit is guided within the main body of the device through the light-transmitting window.

In the above-described conventional device, however, while leakage of light from the original-mount glass is prevented since a pressing plate for pressing an original in a stopped state is in general provided on the original-mount glass, light originated from within the device leaks from the light-transmitting window since no particular member is provided near the light-transmitting window, causing an adverse effect on a human operator.

Furthermore, since external light enters the device from the light-transmitting window, a photosensitive member for receiving image light corresponding to the original sometimes receives unnecessary light, accelerating deterioration of the photosensitive member.

In order to overcome the above-described problems, an approach has been considered in which a cover is provided at the portion of the light-transmitting window. However, the opening and closing operation of the cover greatly depends upon the user. Hence, the above-described problems still remain if the user forgets to close the cover. Accordingly, such an approach is insufficient for a complete solution of the problems.

SUMMARY OF THE INVENTION

It is an object of the present invention to provide an original scanning device which can reliably prevent leakage of light from within the main body of the device.

It is another object of the present invention to provide an original scanning device which can reliably prevent deterioration of a photosensitive member caused by entrance of light within the main body of the device from the outside.

It is still another object of the present invention to provide an original scanning device in which an obturating or light-blocking member provided at the main body of the device is opened and closed in accordance with movement of scanning means.

The present invention pertains to, in one aspect, an original scanning device comprising an original mount for mounting an original, movable scanning means for scanning the original mounted on the original mount when the movable scanning means is moving, an original scanning unit for further scanning the original when the original is at a position different from the position of the original mount, and an obturating member movable to obturate an optical path from the original scanning unit to a main body of the device. The obturating member is movable between positions opening and closing the optical path in accordance with the movement of the movable scanning means.

In another aspect, the present invention pertains to an original scanning device having an aperture for transmitting light, comprising an original mount for mounting an original, the original mount for mounting an original, the original mount provided at a position different from the position of the aperture, movable scanning means for scanning the original mounted on the original mount when the movable scanning means is moving, and an obturating member for selectively obturating light passing through the aperture. The obturating member is movable between positions opening and closing the aperture in accordance with movement of the movable scanning means.

These and other objects, advantages and features of the present invention will become more apparent from the following detailed description of the preferred embodiment taken in conjuction with the accompanying drawings.

DETAILED DESCRIPTION OF THE PREFERRED EMBODIMENT

Figure 1:
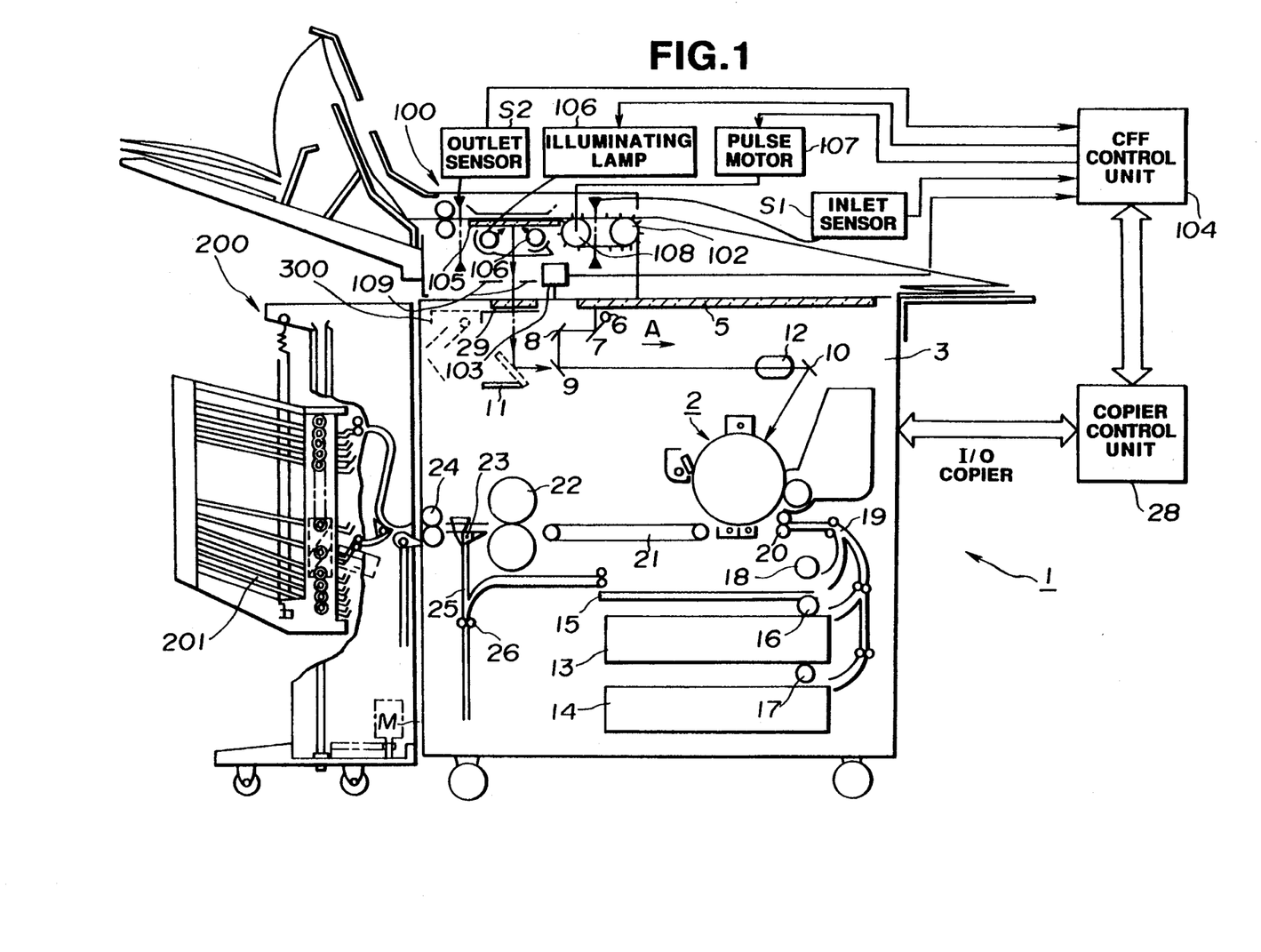
FIG. 1 is a cross-sectional view of an image forming apparatus which includes an original scanning device according to an embodiment of the present invention.

FIG. 1 is a cross-sectional view of the entire image forming apparatus which includes an original scanning device according to an embodiment of the present invention. In FIG. 1, a copier 1 includes a main body 3 of the copier which incorporates a copying unit 2 for forming an image by a well-known electrophotographic process. An original is in general mounted on first original-mount glass 5, and is fixed and set by a pressing plate (not shown), an automatic document feeder, or the like. A light source 6 exposes the original. A first mirror 7 and the light source 6 constitute first scanning means, which moves in the direction of arrow A (the forward-moving direction) while illuminating the original on the original-mount glass 5 by the light source 6, whereby the entire surface of the original is scanned. The light of the first scanning means is reflected by a second mirror 8 and a third mirror 9, passes through a zoom lens 12, and is imaged onto a photosensitive drum, serving as a photosensitive member, within the copying unit 2 after being reflected by a fourth mirror 10. The second mirror 8 and the third mirror 9 are set on the same mirror mount so as to be orthogonal to each other to constitute second scanning means, which moves in the direction of arrow A at a speed half the speed of the first scanning means, comprising the first mirror 7 and the light source 6, so as to maintain a constant optical length. After the completion of the scanning of the original in the forward-moving direction, the first and second scanning means move in the reverse direction (the backward-moving direction) until they return to a first home position which corresponds to a position to start scanning of a fixed original. The above-described operation corresponds to the method of scanning the original while it is fixed.

Next, a description will be provided of the main body 3 of the copier with reference to the flow of a transfer material on which an image is formed.

The main body 3 of the copier includes two cassettes 13 and 14 for accommodating sheets of a transfer material, and an intermediate tray 15 for mounting sheets to be fed again on one surface of each of which an image has been transferred. Paper-feeding rollers 16, 17 and 18 are disposed above the cassettes 13 and 14 and the intermediate tray 15, respectively. A conveying unit 19 is disposed at a position downstream from the paper-feeding rollers 16, 17 and 18, and a pair of registration rollers 20 are provided at a position downstream from the conveying unit 19. The above-described copying unit 2 is provided at a position downstream from the pair of registration rollers 20. A conveying belt 21 and a fixing unit 22 are disposed at positions downstream from the copying unit 2. A flapper 23 for deflecting the moving direction of the sheet material, and a pair of paper-discharging rollers 24 are disposed at portions downstream from the fixing unit 22. The flapper 23 operates when copying operations are performed on two surfaces of a sheet, and deflects the sheet material in the direction of conveying path 28. A pair of conveying rollers 26 switchback the sheet material to discharge it onto the intermediate tray 15. In a multiple copying operation, the pair of paper-discharging rollers 24 switchback the sheet material to convey it along the conveying path 25. As in the case of the above-described copying operations on two surfaces of a sheet, the sheet material is first mounted on the intermediate tray 15, is then conveyed to the copying unit 2 by the paper-feeding roller 18, passes through the fixing unit 22, and is discharged onto a sorter 200 by the pair of paper-discharging rollers 24.

An automatic document feeder (ADF, not shown), and an original scanning unit 100, which scans an original at a position different from the position of the original-mount glass 5, are provided at an upper portion of the main body 3 of the copier. The original scanning unit in the present embodiment comprises a computer-form feeder scanning unit (CFF) which optically scans computer-form paper (CF paper) whose lateral width is greater than the original-mount glass 5. That is, the CFF includes a tractor 102 for conveying the CF paper, second original-mount glass 105 for mounting the CF paper being conveyed, a light source 105 for illuminating the CF paper, a reflector 108, a slit 109 for regulating reflected light from the CF paper, a discharge tray for stocking discharged sheets of the CF paper, and the like. The CFF is detachable at a predetermined position relative to the main body 3 of the copier.

The CFF is at a retracted position when the ADF is used, and the ADF is at a retracted position when the CFF is used. When the CFF is used, scanning by scrolling reading in which an original is continuously moved is performed.

Next, a description will be provided of the operation when the CFF is used. First, a joint or contact switch 103 detects whether or not the CFF has been set in the main body 3 of the copier. CF paper comprises in general continuous paper, and has sprocket holes at both sides of the paper. Accordingly, the user sets the CF paper in the tractor 102 provided with projecting sprockets for engaging the holes.

When the switch 103 detects that the CFF has been set, a CFF control unit 104 receives a detection signal from the switch 103, and transmits the signal to a copier control unit 28. According to the detection signal, the copier control unit 28 controls the first scanning means, comprising the light source 6 and the first mirror 7, and the second scanning means, comprising the second mirror 8 and the third mirror 9, so as to be positioned at a second home position (indicated by broken lines) at the left end of the main body 3 of the copier, as shown in FIG. 1.

Subsequently, a CFF mirror 11 for reflecting light reflected by the CFF 100 in the direction of the zoom lens 12 moves from the state indicated by solid lines (the retracted position) to the state indicated by broken lines (the operating position) shown in FIG.1. The positional relationship among the second original-mount glass 105, the CFF mirror 11 and the zoom lens 12, which serve as the exposure unit at the side of the CFF, is arranged so that the length of the optical path from the first original-mount glass 5 to the zoom lens 12 via the first mirror 7, the second mirror 8 and the third mirror 9 when scanning is performed on a fixed original equals the length of the optical path from the second original-mount glass 105 to the zoom lens 12 after passing through a window 29, serving as an aperture, and being reflected by the CFF mirror 11 when scrolling reading is performed.

A description will now be provided of the CFF mirror 11. The reflector 108, a lamp 106 and the slit 109 are disposed below the second original-mount glass 105. In the case of scanning on a fixed original on the first original-mount glass 5, the CFF mirror 11 is situated at the position indicated in FIG. 2(a) so as not to interfere with the optical system, i.e., the first and second scanning means. In the case of scanning with scrolling reading while moving an original on the second original-mount glass 105, the CFF mirror 11 rotates to the position indicated in FIG. 2(b) (to be described later). At that time, the first mirror 7, the second mirror 8 and the third mirror 9 are controlled so as to be at positions where the optical path is not obturated or blocked. The device is configured such that even if the group of mirrors starts to move in a state in which the CFF mirror 11 is raised due to disconnection of a cable, a sudden accident, or the like, the CFF mirror 11 assumes a retracted state.

Figure 2A:
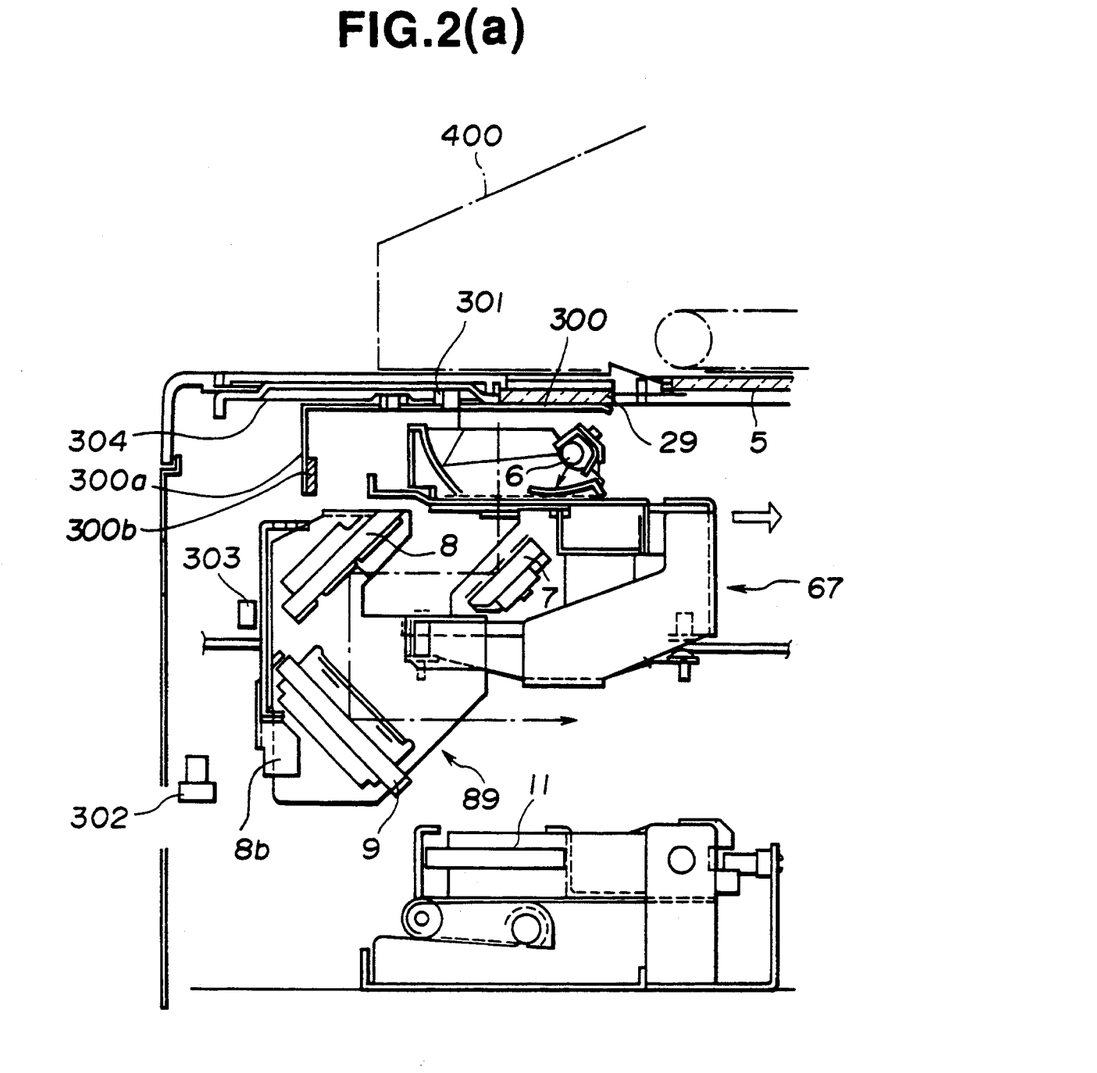
FIGS. 2(a) and 2(b) are cross-sectional views of a portion near an obturating member of the device shown in FIG. 1.
Figure 2B:
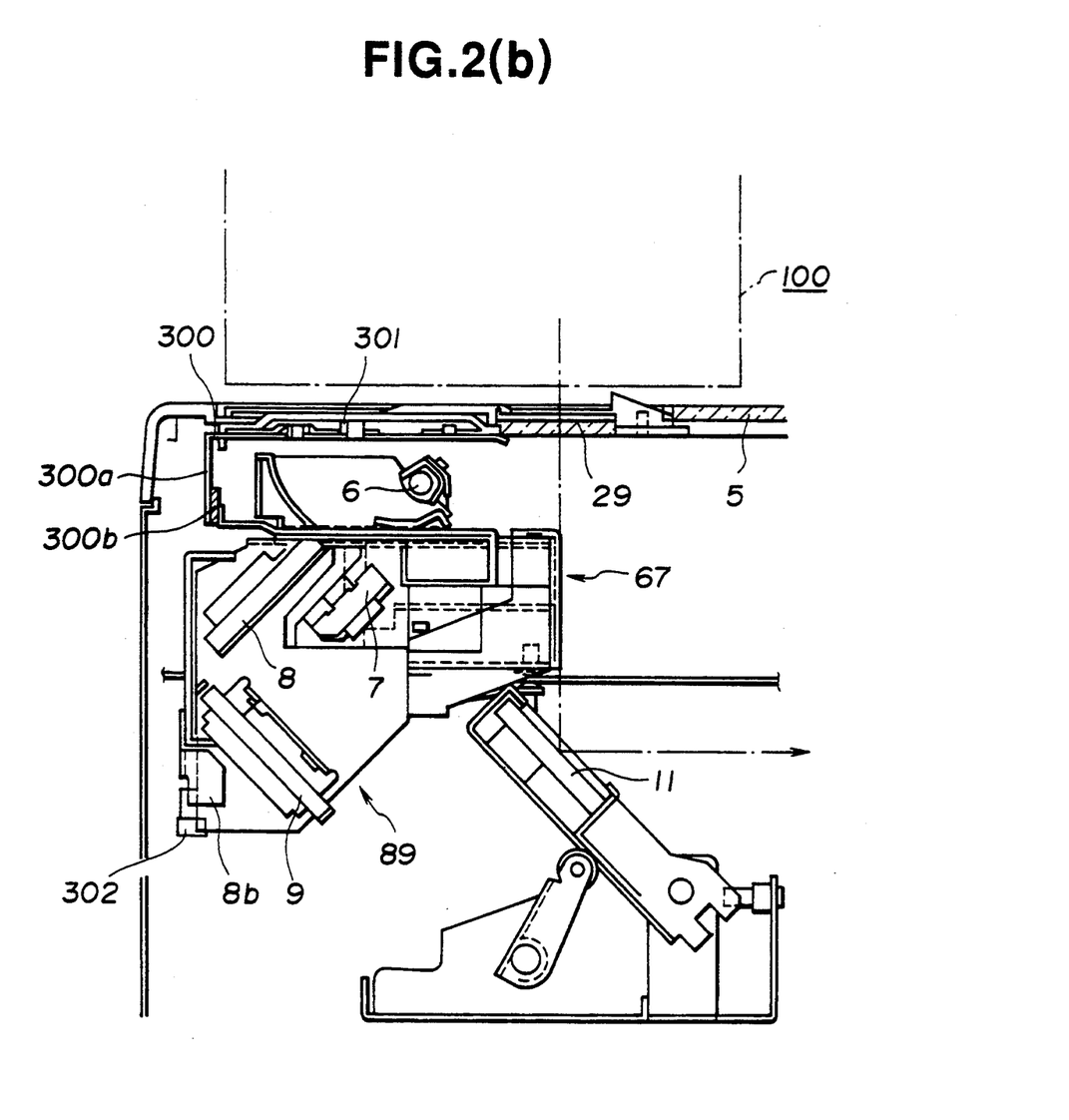

The raising and lowering operations of the CFF mirror 11 are usually performed by the forward and reverse rotations of a motor (not shown). That is, the CFF mirror 11 is raised at substantially 45° by the motor, and is positioned by contacting a stopper provided at a side plate of the main body 3 of the copier.

Next, a description will be provided of an obturating or light-blocking member of the present embodiment with reference to FIGS. 2(a), 2(b), 3 and 4.

As described above, the window 29, serving as an optical aperture, for transmitting light from the CFF is provided at an upper surface of the main body 3 of the copier. A light-transmitting member is provided at the window 29. An obturating member 300 which can obturate or block light is provided below the window 29.

FIG. 2(a) represents a reading operation while fixing an original using the ADF, and indicates a state in which the original on the first original-mount glass 5 starts to be illuminated. In FIG. 2(a), the obturating member 300 is below the window 29 in order to obturate light from the window 29. FIG. 2(b) represents a case in which an original greater than the first original-mount glass 5 is read by scrolling using the CFF (to be described in detail later).

That is, the first and second scanning means move in the backward-moving direction when shifting from the state shown in FIG. 2(a) to the state shown in FIG. 2(b). At that time, a sensor 302 provided at the main body 3 of the copier detects a flag 8b provided in the second scanning means 89, which is positioned at a position at the leftmost position where light from the CFF is not obturated. The first scanning means 67 also moves to the left following the movement of the second scanning means 89, and retracts to a position where light from the CFF is not obturated. The first scanning means also contacts a contacting portion 300a of the obturating member 300, which also moves the left, so that the optical path of the window 29 is opened. In FIGS. 2(a) and 2(b), reference numeral 300b represents a piece of felt or the like for absorbing shock caused by contact with the first scanning means 67.

The obturating member 300 is always biased in the rightward direction by a spring member 301 serving as elastic member (whose biasing force is smaller than the force applied to move the first scanning means 87).

As shown in FIG. 2(a), when the original on the first original-mount glass 5 is scanned, a sensor 303 detects detects the second scanning means 89. The first scanning means 67 enters the next scanning operation without contacting the obturating member 300. The lower surface of the obturating member 300 is coated with white paint so as to be a reference when the surface potential of the drum of the copier is controlled. The surface potential is controlled while illuminating the lower surface of the obturating member 300 at a first copying operation after the main switch has been switched on.

The operation of the present embodiment will be further described with reference to FIGS. 3 and 4.

Figure 3:
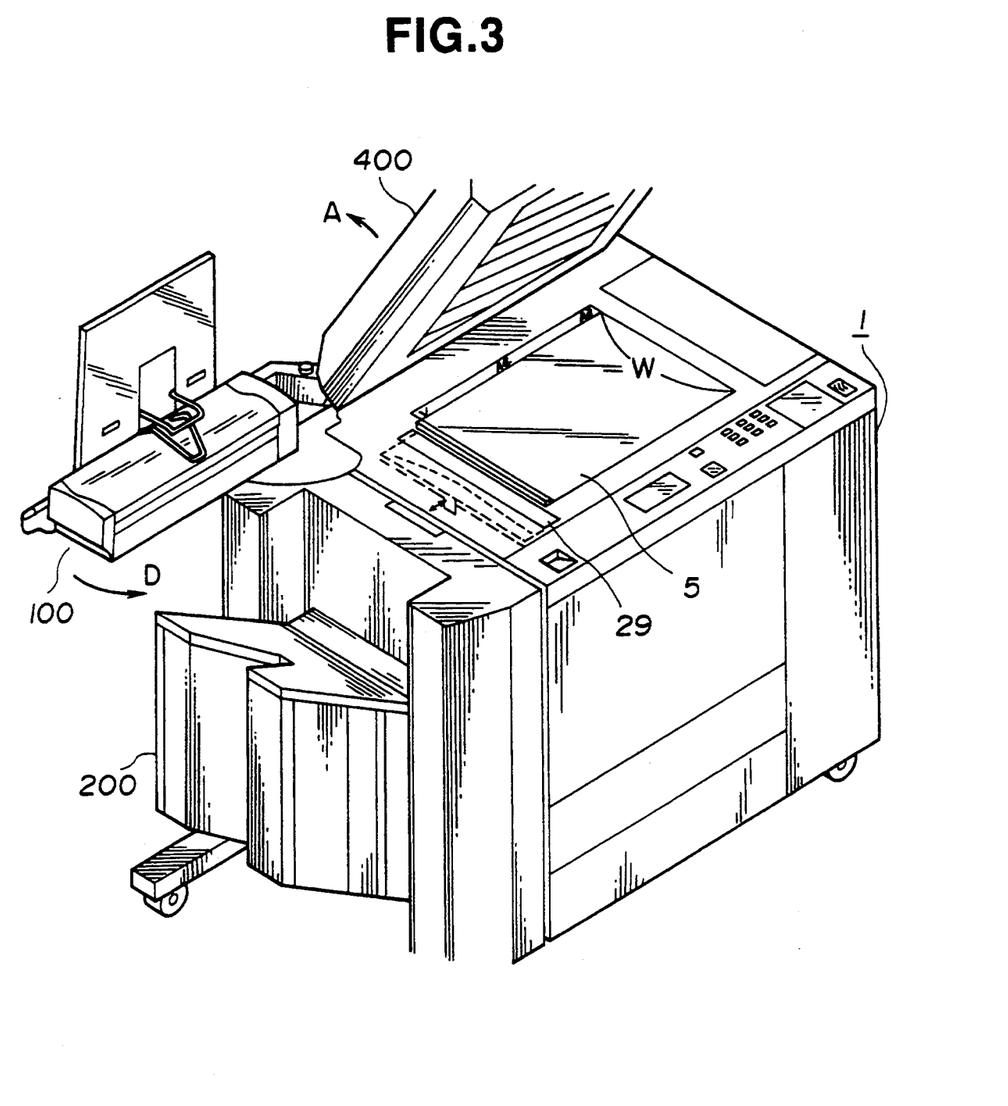
FIG. 3 is a schematic perspective view of the apparatus shown in FIG. 1.

FIG. 3 is a perspective view of the apparatus of the present embodiment. The ADF 400 and the CFF 100 are disposed at upper portions of the copier 1. Postprocessing of sheets of copy paper is performed by the sorter 200.

The ADF 400 fixes the original while stopping it on the first original-mount glass 5. The original is scanned by the optical exposure system within the copier, and is imaged. The CFF 100 conveys and exposes CF paper whose width is greater than the width W of the first original-mount glass 5. When the CFF 100 is used, the ADF 400 is retracted in the direction of arrow A, and the CFF 100 is rotated in the direction D and is set at a positioning portion (not shown) on the copier 1.

Figure 4:
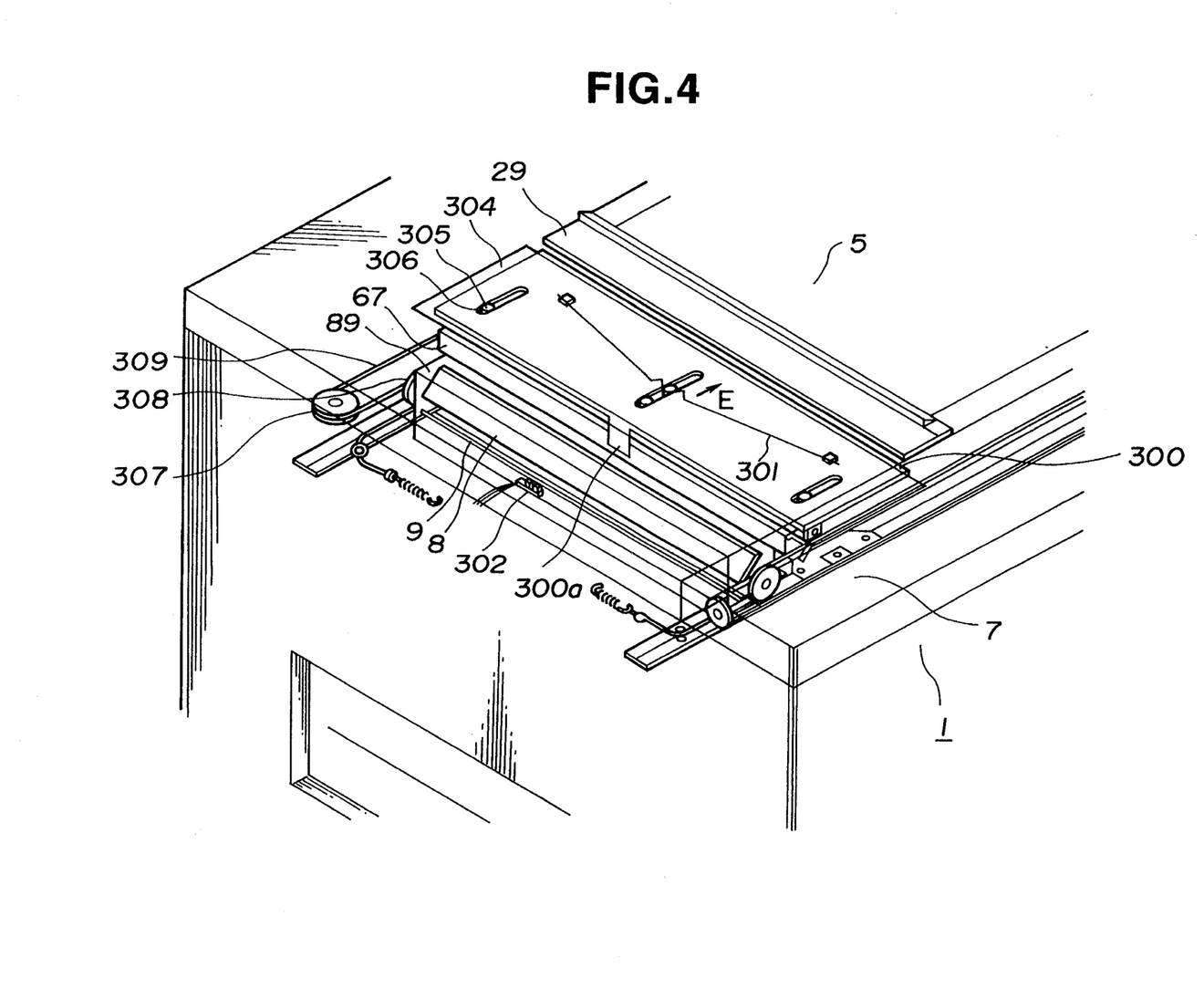
FIG. 4 is a perspective view of a portion near the obturating member of the device shown in FIG. 1.

FIG. 4 is a perspective view of the obturating member 300, as seen through the upper cover of the copier 1, and indicates a state in which the obturating member 300 is moved to the paper-discharging side by the first scanning means 67, and the window 29 is opened. The obturating member 300 is supported on a supporting plate 304 by caulking shafts 305 and pushers 306. As described above, the spring member 301 biases the obturating member 300 in the direction illustrated by arrow E. The first scanning means 67 and the second scanning means 89 are driven by a motor (not shown) via pulleys 307 and 308 and a wire 309.

As described above, in the present embodiment, a biasing member is provided for the obturating member so that the obturating member is biased in the direction of being closed. Hence, it is possible to prevent the accident that the user forgets to close the obturating member which may happen when the user opens and closes the obturating member, and thereby to prevent leakage of internal light on a human operator, and deterioration of a photosensitive member by external light. Since the obturating member is opened and closed by the scanning means for scanning an original, it is unnecessary to provide a particular mechanism for opening and closing the obturating member, so that the configuration of the apparatus can be simplified, and the production cost can be reduced.

Next, the operation when the CFF is used will be described with reference to the flowchart shown in FIG. 5, and FIGS. 6 through 8.

Figure 5:
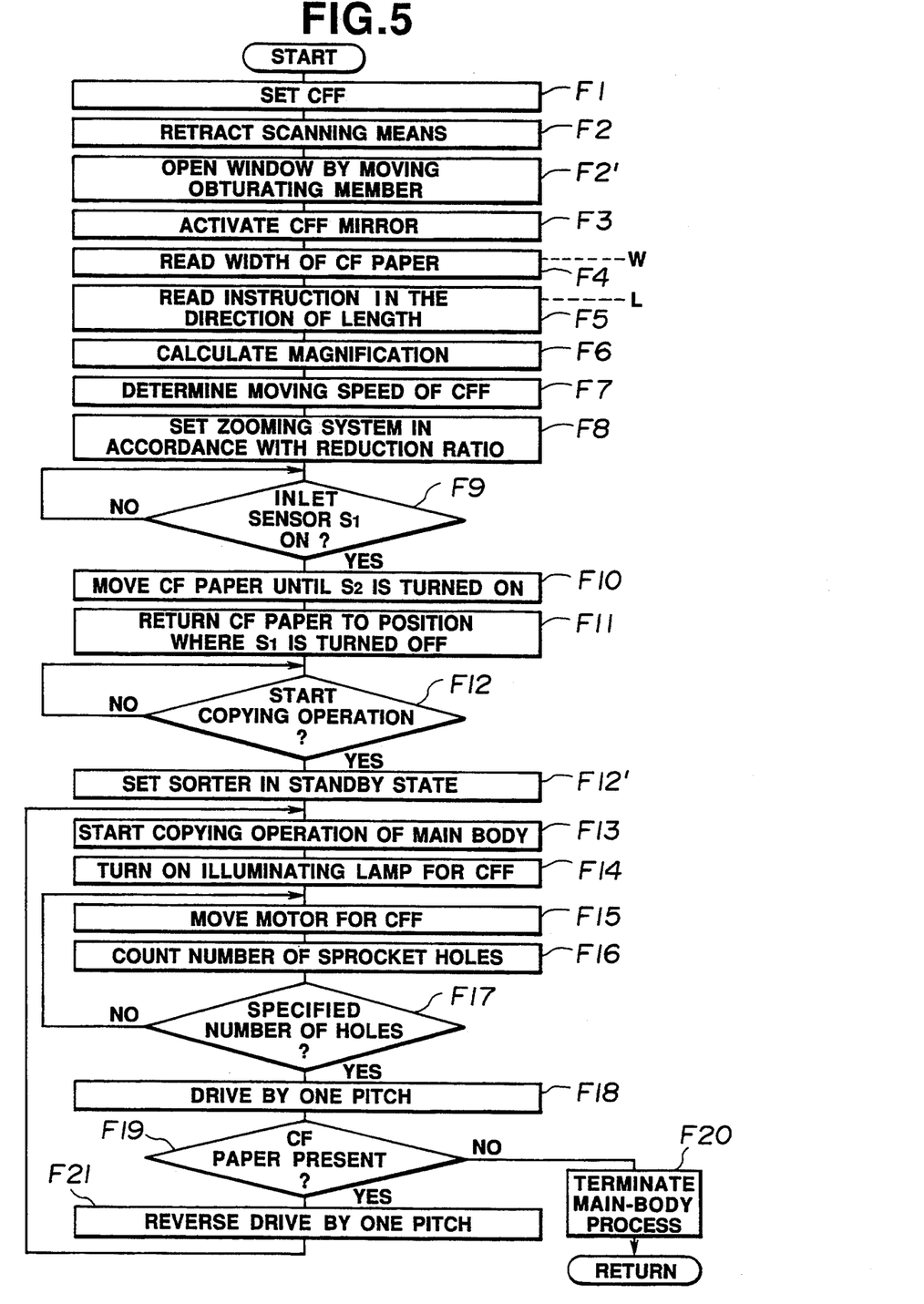
FIG. 5 is a flowchart illustrating the operation of a preferred embodiment.
Figure 6:
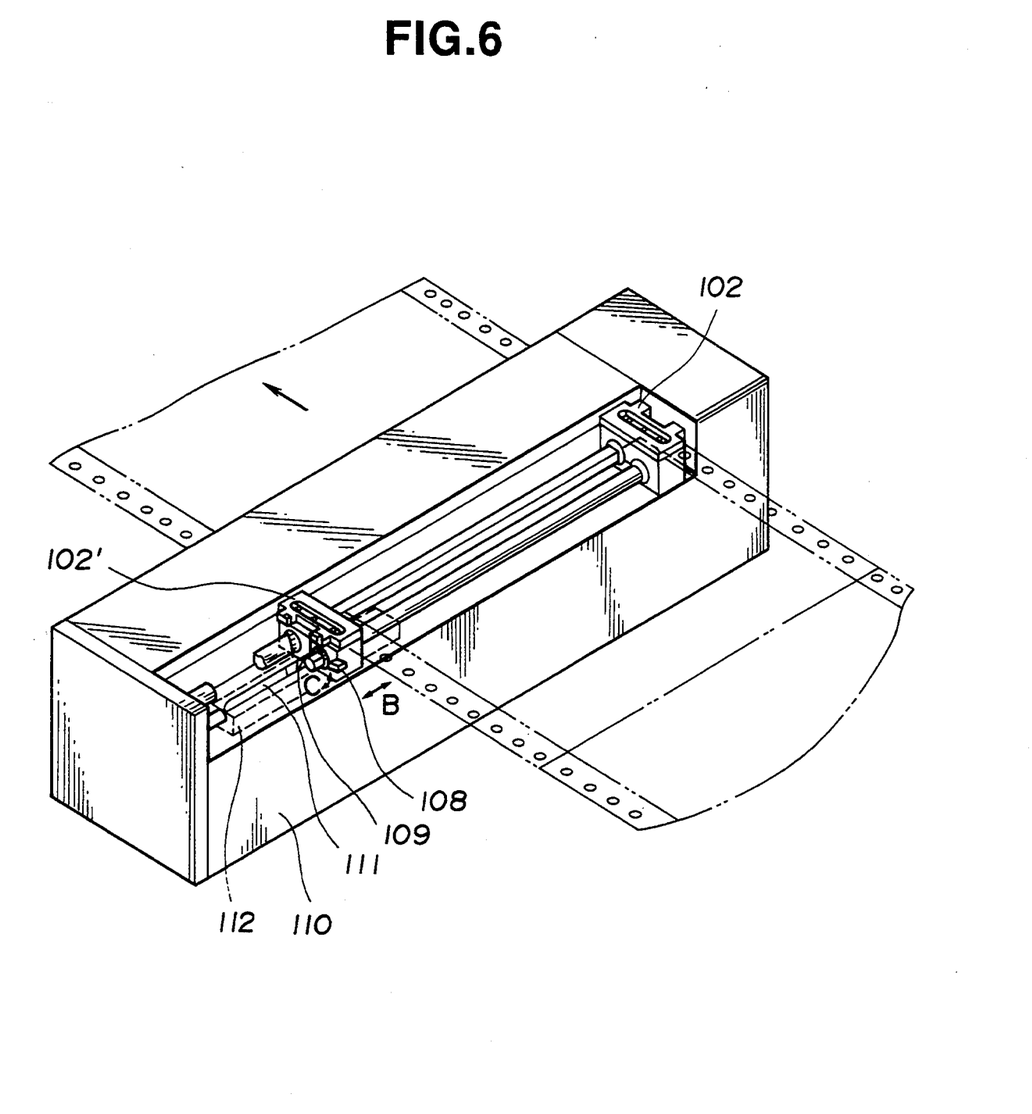
FIG. 6 is a perspective view of a CFF (computer-form feeder) of a preferred embodiment.
Figure 7:
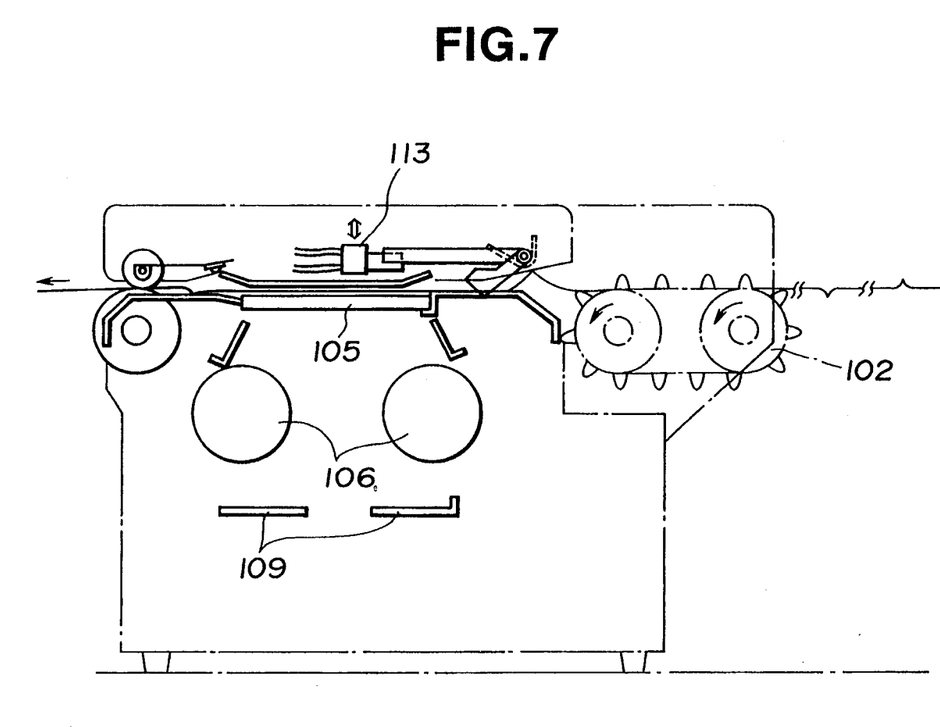
FIG. 7 is a cross-sectional view of the CFF.

First, the CFF is set in the main body 3 of the copier (step F1). Subsequently, the scanning means are retracted to the second home position (step F2), and the window 29 is simultaneously opened by moving the obturating member 300 (step F2'). The CFF mirror 11 is then moved to the position indicated by broken lines (see FIG. 1, step F3). Subsequently, the CF paper is set. A tractor 102' is configured so as to be movable in the direction of the center (indicated by two-headed arrow B shown in FIG. 6), and to be locked or unlocked by turning a lever 108 in the direction of two-headed arrow C.

A size detection lever 109 is mounted below the tractor 102', and is connected to a slider 112 via a round groove 111 provided in a cover 110 immediately below the tractor 102'. The size detection lever 109 detects the width of the CF paper (step F4).

Subsequently, the number of holes in one page of the CF paper is detected. A system may be adopted in which the user inputs the number of holes. In an automatic detection method, the number of holes is counted in the following way. That is, since a perforated portion between adjacent pages is folded, the successive perforated portions become, for example, concave, convex, concave, convex and so on. If a page detection sensor 113 (see FIG. 7) for detecting convex portions (or concave portions), and a transmitting photo-interrupter-type sensor separately provided for counting sprocket holes (the outlet sensor $S_2$ shown in FIG. 1, which may also function as the inlet sensor $S_1$) count the number of sprocket holes between adjacent convex portions while feeding a few sheets of the CF paper, half the counted number equals the number of holes in one page. Subsequently, the CF paper is returned to the original state by conveying it in the reverse direction by a fed amount. Thus, information relating to the sheet in the feeding direction is obtained (step F5), and copying magnification close to unit magnification is automatically calculated so that all information is included in cut paper while leaving a space at edges of the cut paper. The size of the cut paper is also automatically selected (step F6). Subsequently, the speed to convey the CF paper is determined in accordance with the copying magnification (step S7), and the zoom lens 12 is set to a zooming position in accordance with the reduction ratio (step F8).

Subsequently, it is checked whether or not the inlet sensor $S_1$ is turned on (indicating that the CF paper is present) (step F9). If the result of the check is affirmative, the CF paper is moved until the outlet sensor $S_2$ is turned on (step F10). If the outlet sensor $S_2$ is turned on, the CF paper is conveyed in the reverse direction to be returned to a position where the inlet sensor $S_1$ is turned off (step F11). If a copy-start signal enters as a result of depressing a copy-start button on an operation unit (not shown) (step F12), the sorter 200 is brought in a standby state so as to mount sheets of the cut paper starting from the lowermost bin 201 (see FIG. 1) (step F12'). Subsequently, the copying process of the main body of the copier is operated (step F13), the illuminating lamp 106 for the CFF is turned on (step F14), the pulse motor 107 for the CFF is rotated (step F15), and a counting operation of the number of sprocket holes is started (step F16).

Figure 8A:
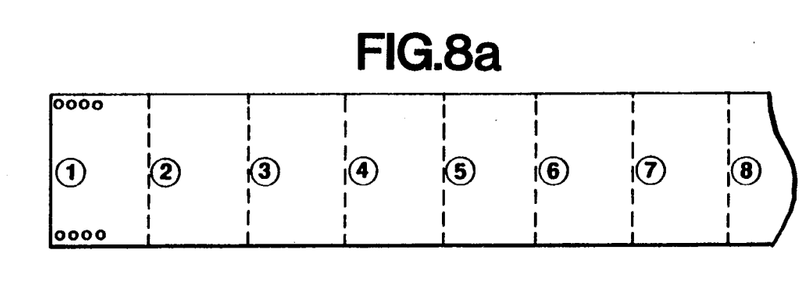
FIGS. 8(a) and 8(b) are diagrams illustrating correspondence between continuous original paper and cut paper.
Figure 8B:
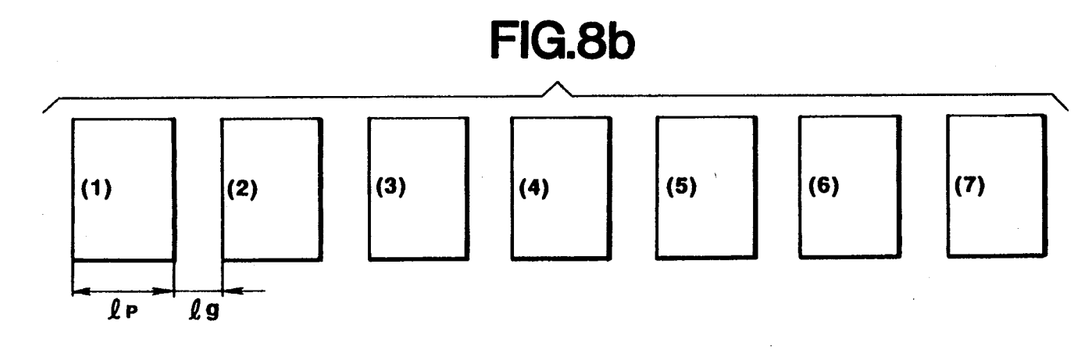

As shown in FIG. 8, information (① on the first page, ② on the second page, and so on) from the CF paper, serving as the original, is exposed and scanned by scrolling reading according to the above-described procedure, and images ((1) for the first page, (2) for the second page, and so on) are formed on sheets of the cut paper, serving as the output paper of the copier. Symbol $l_p$ represents the length of the paper, serving as an image forming region, and symbol $l_g$ represents a space between adjacent sheets of the cut paper. If the number of sprocket holes reaches the specified number of holes (on one page), it is determined that scanning for one page has been completed (step F17).

Subsequently, the CF paper is conveyed by one pitch or a few pitches of the sprocket holes. If the inlet sensor $S_1$ indicates absence of the CF paper during that time period in step F19, the process of the main body of the copier is terminated, whereby image formation is terminated.

If the inlet sensor $S_1$ indicates presence of the CF paper in step F19, the paper returns to the original position by being conveyed in the reverse direction by one pitch or a few pitches of the sprocket holes (step F21). At the same time, the copying process of the main body of the copier is started (step F13). Subsequently, the above-described operations are repeated until the inlet sensor $S_1$ is turned off (indicating that the CF paper is absent).

Figure 9A:
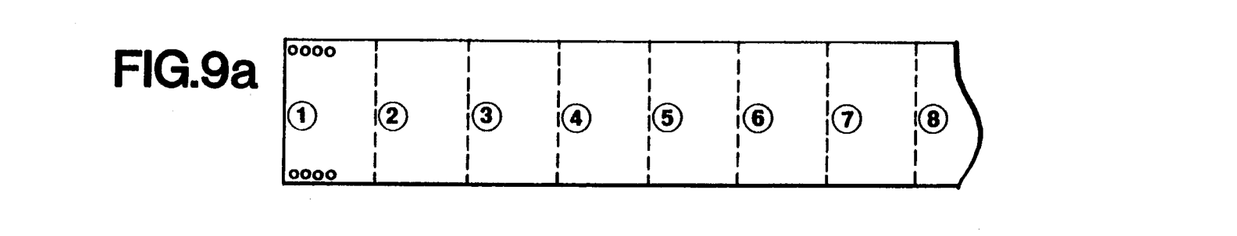
FIGS. 9(a) and 9(b) are diagrams illustrating movement of original paper represented by its speed distribution.
Figure 9B:
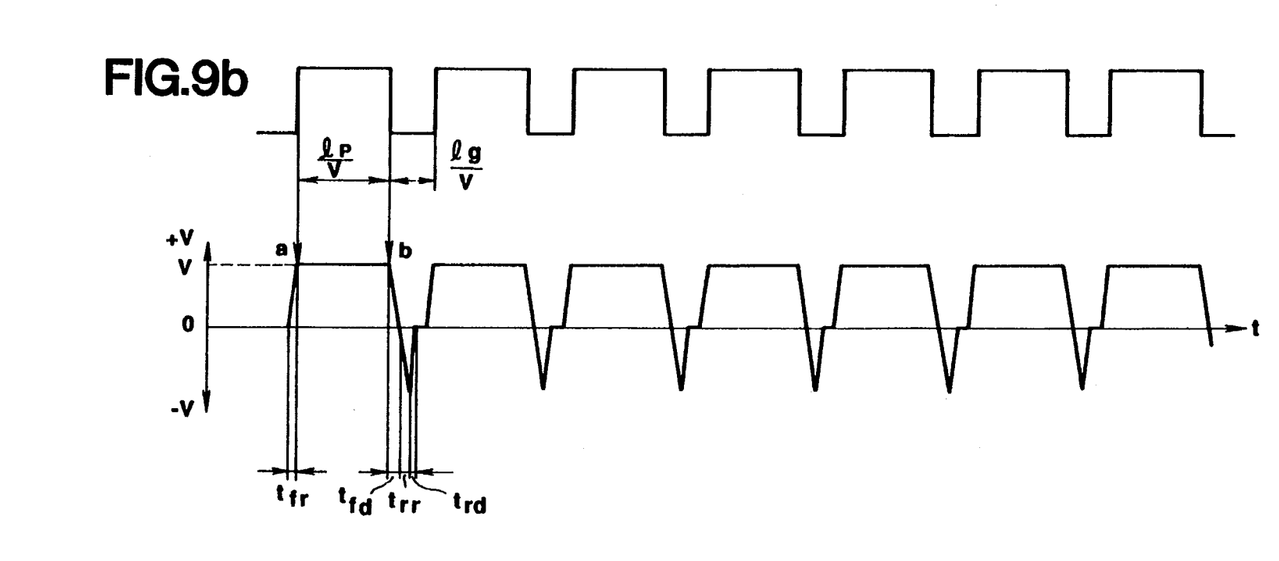
Figure 10:
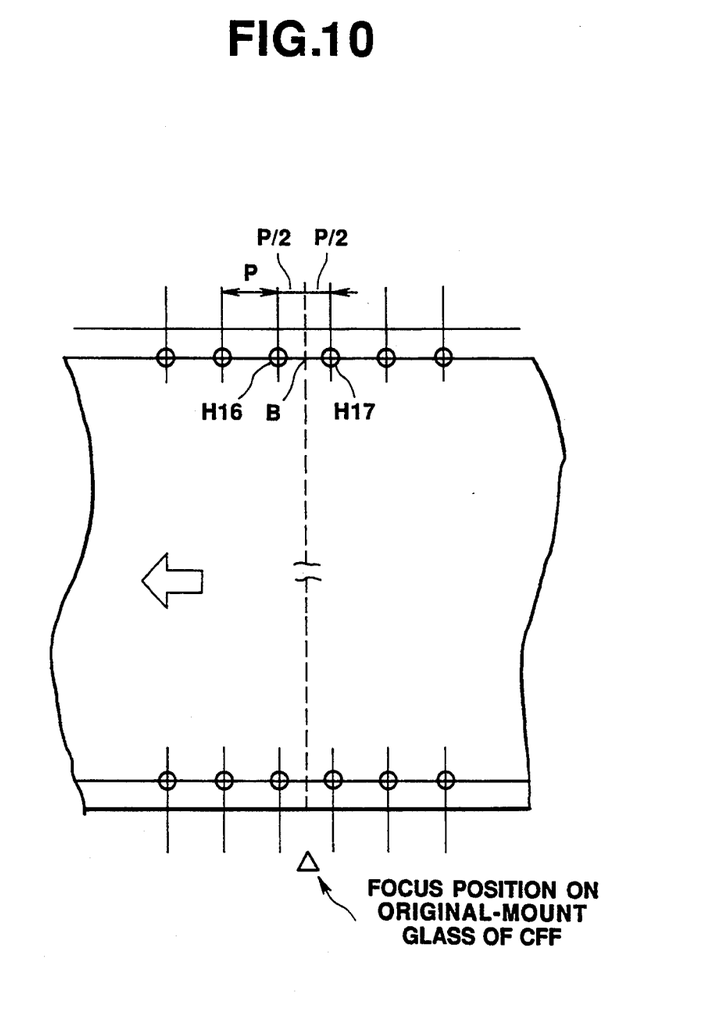
FIG. 10 is a schematic diagram of CF (computer form) paper on an original-mount glass.

Next, a description will be provided of synchronization of the leading ends of CF paper (continuous paper) and cut paper, and movement of sheets with reference to FIGS. 9 and 10. FIG. 9 shows movement of the conveying speed of CF paper. According to rise characteristics of the pulse motor 107 for conveying the CFF, a time $t_{fr}$ is required until CF paper reaches the conveying speed of the CF paper, and the process speed V mm/s of the copier. The speed of the CF paper at point "a" equals V. The copier is controlled so as to convey the CF paper at a constant speed V from point "a" to point b. The speed is reduced by the pulse motor 107 at a time period of several tens of ms (milliseconds) after the image region of page ① ((the number of sprocket holes on one page)$\times P + \frac{1}{2}P$, where P represents the pitch between adjacent holes) has passed the focal position on the second original-mount glass 105. A time $t_{fd}$ is required until the CF paper stops. In the present embodiment, the CF paper starts to reduce its speed from point B shown in FIG. 10, and stops at point $H_{17}$ after advancing by P/2. Subsequently, the CF paper is returned in the reverse direction by a time period $(t_{rr}+t_{rd})$ (returned by a distance P (step F21)), and is stopped at point $H_{16}$. The second page is then brought in a standby state, and is synchronized with the cut paper. The above-described operation is repeated for n pages until the CF paper is absent (steps F19 and F20).

When the sorter 200 is used for dealing with output cut paper, sheets of the cut paper may be mounted on nonsorting tray. In the present embodiment, however, a grouping mode is automatically set, and sheets of the cut paper are conveyed starting from the lowermost bin 201. If sheets of the cut paper are discharged from the main body of the copier in a face-up state, the CF paper is set in the CFF starting from the final n-th page, and sheets of the cut paper are output in the sequence of the n-th page, the (n−1)-th page, and so on. If sheets of the cut paper are discharged in a face-down state, the CF paper is set starting from the leading page, and sheets of the cut paper are output in the sequence of the first page, the second page, and so on. Sheets of the cut paper are mounted from the lowermost bin. If sheets whose number equals the acceptable number of the bin have been discharged, sheets are switched to be discharged onto the bin next to the lowermost bin. If the uppermost bin (or the nonsorting tray) becomes full up, the CFF is stopped, and a warning message "take out sheets" is displayed on a display unit of the main body of the copier. If the output device comprises a finisher stacker, sheets of the CF paper are set in the same manner as in the case of using a sorter. If sheets of the cut paper whose number equals the acceptable number of sheets are discharged, the CFF is stopped, and a warning message is displayed in the same manner as described above. Thus, scanning of the original by the CFF, serving as the original scanning unit, is completed.

Although in the above-described embodiment, a drum-like photosensitive member is used, a sensor, such as a photoelectric converter or the like, which receives image light and convert the light into an electrical signal, may also be used.

Although in the present embodiment, the original scanning unit receives light reflected by an original, the received light may comprise light transmitted through a transparent film or the like. The present invention is applicable to any device, provided that an original is scanned outside the main body of the device, and image light from the original enters the device through an aperture.

While the present invention has been described with respect to what is presently considered to be the preferred embodiment, it is to be understood that the invention is not limited to the disclosed embodiment. The present invention is intended to cover various modifications and equivalent arrangements included within the spirit and scope of the appended claims.

What is claimed is:

1. An original scanning device, comprising:
   an original mount for mounting an original;
   movable scanning means for scanning the original mounted on said original mount when said movable scanning means is moving;
   an original scanning unit for further scanning the original when the original is at a position different from the position of said original mount; and
   an obturating mender movable to obturate an optical path from said original scanning unit to a main body of the device, wherein said obturating member is moved between positions opening and closing the optical path by said movable scanning means.

2. An original scanning device, comprising:
   an original mount for mounting an original
   movable scanning means for scanning the original mounted on said original mount when said movable scanning means is moving;
   an original scanning unit for further scanning the original when the original is at a position different from the position of said original mount; and
   an obturating member movable to obturate an optical path from said original scanning unit to a main body of the device, wherein said obturating member is moved between positions opening and closing the optical path by said movable scanning means,
   wherein said movable scanning means moves relative to a home position and opens the optical path by moving said obturating member in accordance with the movement of said scanning means along a first direction away from the home position.

3. A device according to claim 2, wherein the first direction is a backward-moving direction of said scanning means.

4. A device according to claim 2, wherein said obturating member is biased in a second direction different from the first direction by an elastic member.

5. A device according to claim 4, wherein the second direction is a forward-moving direction of said scanning means.

6. A device according to claim 1, wherein said original scanning unit is positionable at least at an operating position for scanning the original relative to the main body of the device and at a nonoperating position for not scanning the original.

7. A device according to claim 1, wherein said original scanning unit scans the original while moving the original.

8. An original scanning device, comprising:
   an original mount for mounting an original;
   movable scanning means for scanning the original mounted on said original mount when said movable scanning means is moving;
   an original scanning unit for further scanning the original when the original is at a position different from the position of said original mount; and
   an obturating member movable to obturate an optical path from said original scanning unit to a main body of the device, wherein said obturating member is moved between positions opening and closing the optical path by said movable scanning means,
   wherein said obturating member is contactable with said movable scanning means and is moved by the contact.

9. An original scanning device, comprising:
   an original mount for mounting an original;
   an aperture for transmitting light positioned at a position different from the position of the original mount;
   movable scanning means for scanning the original mounted on said original mount when said movable scanning unit is moving; and
   an obturating member for selectively obturating light passing through the aperture, wherein said obturating member is moved between positions opening and closing the aperture by said movable scanning means.

10. A device according to claim 9, further comprising an original scanning unit for further scanning the original at a position different from the position of said original mount, and wherein light from said original scanning unit passes through the aperture.

11. A device according to claim 10, wherein light from the original mounted on said original mount and light from said original scanning unit are both received by a single photosensitive member.

12. A device according to claim 9, wherein said original mount is positioned at a position adjacent to the aperture.

13. A device according to claim 9, comprising a light-tranmitting member disposed in the aperture.

14. An original scanning device having an aperture for transmitting light, comprising:
   an original mount for mounting an original, said original mount provided at a position different from the position of the aperture;
   movable scanning means for scanning the original mounted on said original mount when said movable scanning unit is moving; and
   an obturating member for selectively obturating light passing through the aperture, said obturating member movable between positions opening and closing the aperture in accordance with movement of said movable scanning means,
   wherein said movable scanning means moves relative to a home position and opens the optical path by moving said obturating member in accordance with the movement of said movable scanning means along a first direction away from the home position.

15. A device according to claim 14, wherein the first direction is a backward-moving direction of said scanning mans.

16. A device according to claim 14, wherein said obturating member is biased in a second direction different from the first direction.

17. A device according to claim 16, wherein the second direction is a forward-moving direction of said scanning means.

18. A device according to claim 10, wherein said original scanning unit is positionable at least at an operating position for scanning the original relative to the main body of the device and at a nonoperating position for not scanning the original.

19. A device according to claim 10, wherein said original scanning unit scans the original while moving the original.

20. An original scanning device having an aperture for transmitting light, comprising:

an original mount for mounting an original, said original mount provided at a position different from the position of the aperture;

movable scanning means for scanning the original mounted on said original mount when said movable scanning unit is moving; and an obturating member for selectively obturating light passing through the aperture, said obturating member movable between positions opening and closing the aperture in accordance with movement of said movable scanning means, wherein said obturating member is contactable with said movable scanning means and is moved by the contact.

21. An original scanning device, comprising:

an original mount for mounting a first kind of original;

movable scanning means for scanning the original mounted on said original mount;

an original scanning unit for scanning a second kind of original; and an obturating member movable to obturate an optical path from said original scanning unit to a main body of the device, wherein said obturating member is moved between positions opening and closing the optical path by said movable scanning means.

22. A device according to claim 21, wherein said second kind of original is a computer-form paper.

* * * * *

UNITED STATES PATENT AND TRADEMARK OFFICE
CERTIFICATE OF CORRECTION

PATENT NO. : 5,373,352
DATED : December 13, 1994
INVENTOR(S) : Uto

It is certified that error appears in the above-indentified patent and that said Letters Patent is hereby corrected as shown below:

COLUMN 2:

Line 20, "the original mount for mounting an" should be deleted; and
Line 21, "original," should be deleted.

COLUMN 10:

Line 54, "mans." should read --means.--.

Signed and Sealed this

Thirtieth Day of May, 1995

Attest:

BRUCE LEHMAN

Attesting Officer

Commissioner of Patents and Trademarks